United States Patent
Edelman

[11] Patent Number: 6,062,016
[45] Date of Patent: May 16, 2000

[54] GAS TURBINE ENGINE FIXED SPEED LIGHT-OFF METHOD

[75] Inventor: Edward C. Edelman, Agoura Hills, Calif.

[73] Assignee: Capstone Turbine Corporation, Tarzana, Calif.

[21] Appl. No.: 08/837,600

[22] Filed: Apr. 21, 1997

[51] Int. Cl.$^7$ ........................................................ F02C 7/26
[52] U.S. Cl. ........................................ 60/39.06; 60/39.141
[58] Field of Search ................................ 60/39.06, 39.141, 60/39.142, 39.281

[56] References Cited

U.S. PATENT DOCUMENTS

| | | | |
|---|---|---|---|
| 3,520,133 | 7/1970 | Loft et al. | 60/39.281 |
| 3,793,826 | 2/1974 | Holleboom et al. | |
| 3,834,160 | 9/1974 | Moehring et al. | |
| 3,844,112 | 10/1974 | Harrison. | |
| 3,943,372 | 3/1976 | Smith et al. | 60/39.281 |
| 3,958,413 | 5/1976 | Cornelius et al. | |
| 4,039,804 | 8/1977 | Reed et al. | |
| 4,134,259 | 1/1979 | Gardner et al. | |
| 4,321,791 | 3/1982 | Carroll | 60/39.141 |
| 4,350,008 | 9/1982 | Zickwolf, Jr. | |
| 4,817,389 | 4/1989 | Holladay et al. | |
| 5,101,619 | 4/1992 | Morris et al. | 60/39.141 |
| 5,107,674 | 4/1992 | Wibbelsman et al. | |
| 5,123,239 | 6/1992 | Rodgers. | |
| 5,127,220 | 7/1992 | Jesrai et al. | |
| 5,129,221 | 7/1992 | Walker et al. | 60/39.141 |
| 5,212,943 | 5/1993 | Harris. | |

*Primary Examiner*—Louis J. Casaregola
*Attorney, Agent, or Firm*—Albert J. Miller

[57] ABSTRACT

A gas turbine engine light-off system and method in which the gas turbine engine is operated at a fixed speed to provide a substantially constant supply of combustion air for light-off and the fuel flow is ramped up to achieve the correct fuel-to-air ratio for light-off.

5 Claims, 3 Drawing Sheets

GAS TURBINE ENGINE FIXED SPEED LIGHT-OFF METHOD

TECHNICAL FIELD

This invention relates to the general field of gas turbine engines and more particularly to an improved gas turbine light-off system and method.

BACKGROUND OF THE INVENTION

In a gas turbine engine, inlet air is continuously compressed, mixed with fuel in an inflammable proportion, and then contacted with an ignition source to ignite the mixture which will then continue to burn. The heat energy thus released then flows in the combustion gases to a turbine where it is converted to rotary energy for driving equipment such as an electrical generator. The combustion gases are then exhausted to atmosphere after giving up some of their remaining heat to the incoming air provided from the gas turbine compressor.

The starting of a gas turbine engine is a complex operation which is most desirably done as simply and as automatically as possible. Typically, before it is run on its own power, the gas turbine engine must be accelerated by an external source of power to provide sufficient air flow to the combustor for light-off. Typically, engine speed varies as a function of the torque versus speed characteristics of the starter motor. Fuel flow to the gas turbine engine is scheduled "open loop" as a function of engine speed and ambient conditions such as temperature and atmospheric pressure. This "open loop" approach is, however, extremely sensitive to fuel control variations, gas turbine engine variations, sensor accuracy and ambient conditions to achieve the proper or correct fuel-to-air ratio required for ignition and subsequent combustion. Starting the gas turbine engine at low temperatures and high altitudes is particularly troublesome with this "open-loop approach.

In addition, improved performance requirements for a gas turbine engine and increasing restrictions on gas turbine engine emissions have led to gas turbine engine designs with improved atomization of the fuel and increased mixing of the fuel and air such that the fuel-to-air ratio is maintained relatively lean. What this means is that the ignition envelope, that is the envelope or fuel-to-air ratio where ignition is possible, is highly dependent on the local velocity, and the pressure and temperature of the gases. This ignition envelope is thus significantly narrowed and thus is harder to achieve.

SUMMARY OF THE INVENTION

The improved gas turbine engine light-off system and method of the present invention employs a gas turbine engine operating at a fixed speed to provide a substantially constant supply of combustion air for light-off. The fuel flow is ramped up to achieve the correct fuel-to-air ratio for light-off at which point light-off occurs; the ignition source having been activated as the fuel flow is being ramped up.

The gas turbine engine light-off system and method of the present invention is insensitive to fuel control variations, gas turbine engine variations, and ambient conditions. Fuel is not scheduled as a function of gas turbine engine speed and light-off will occur under any conditions.

BRIEF DESCRIPTION OF THE DRAWINGS

Figure 1:
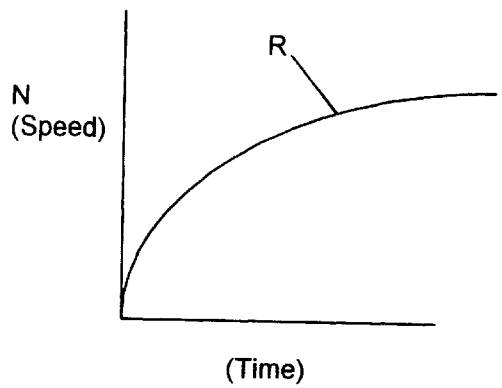
Figure 2:
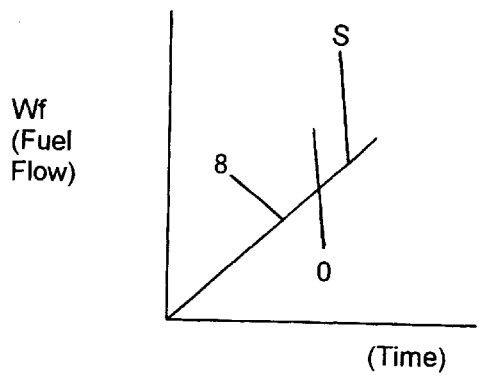
Figure 3:
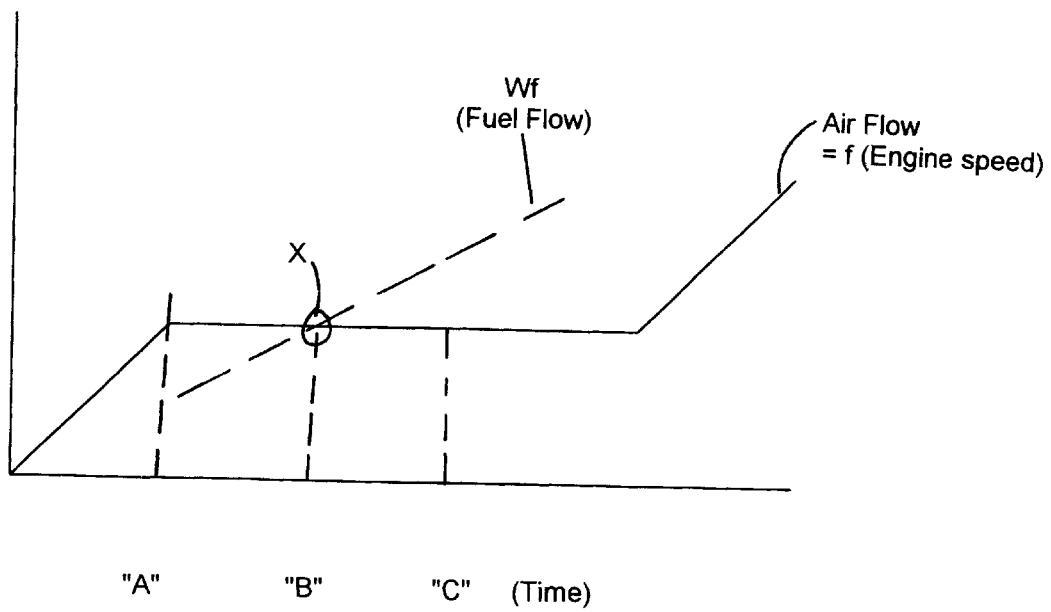
Figure 4:
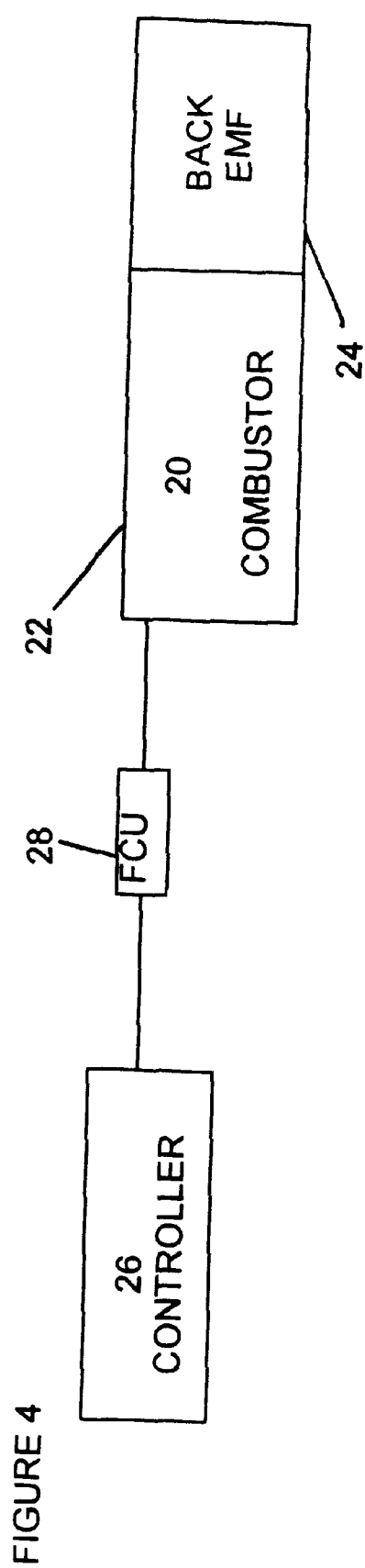
Figure 5:
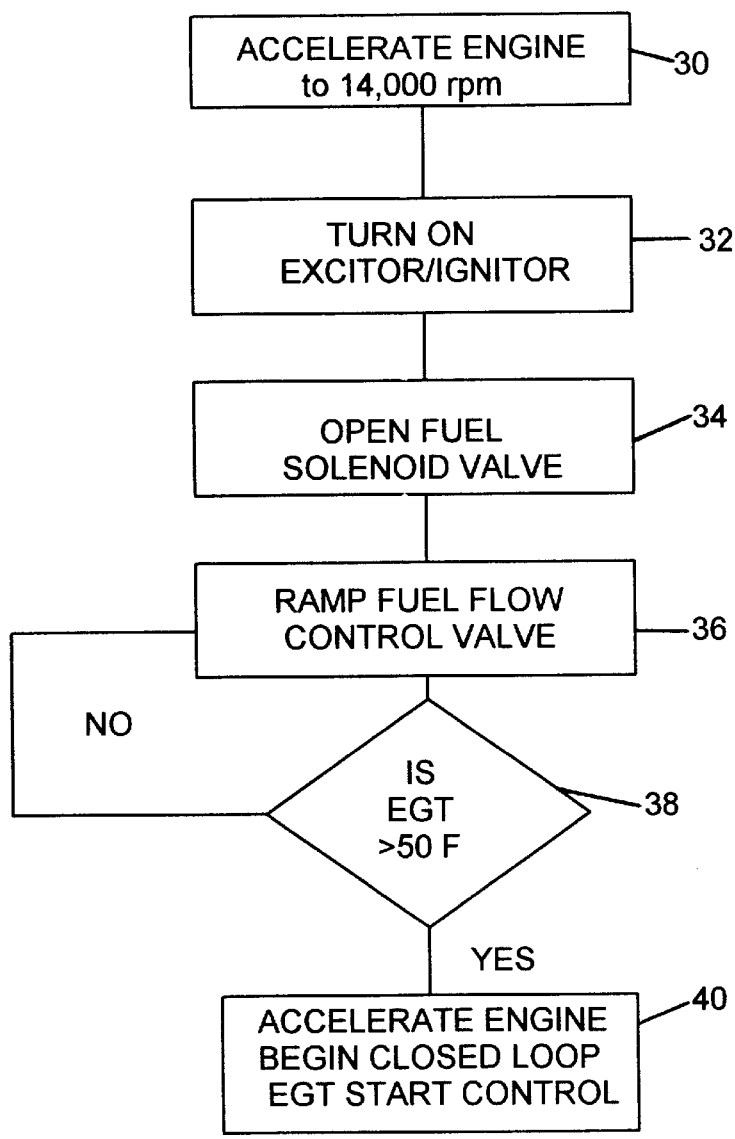
Figure 1:
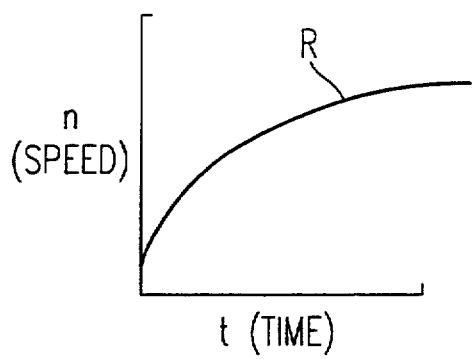
Figure 2:
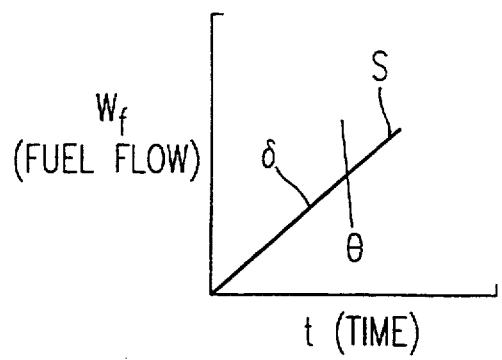
Figure 3:
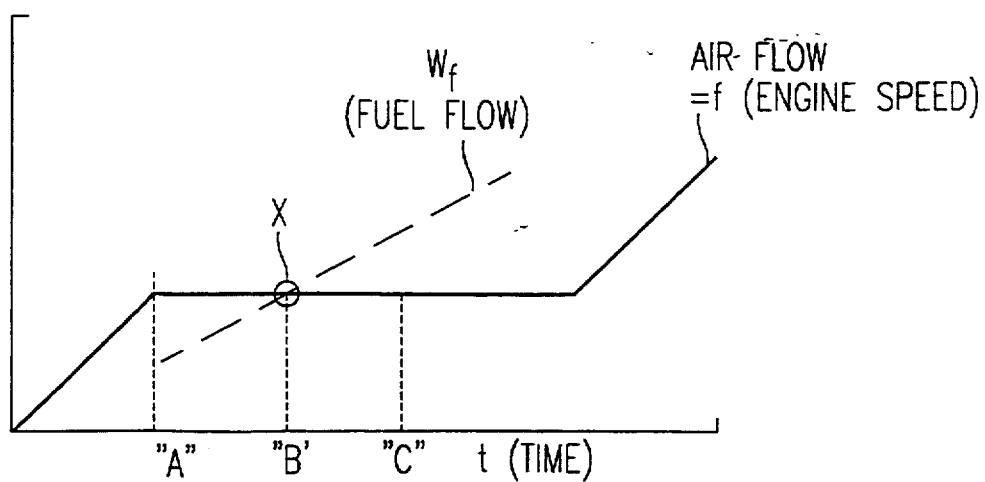
Figure 4:
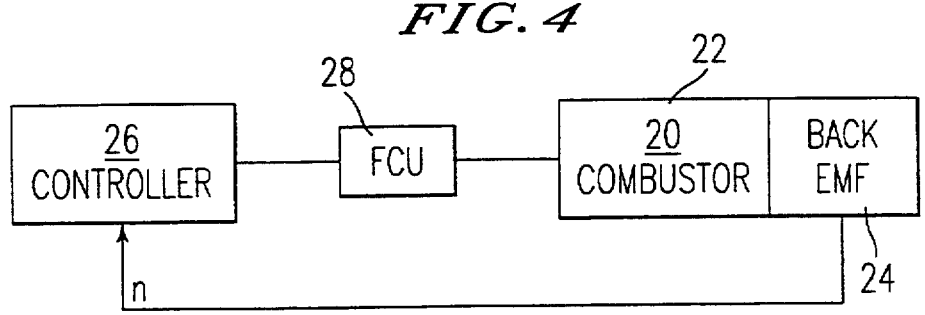
Figure 5:
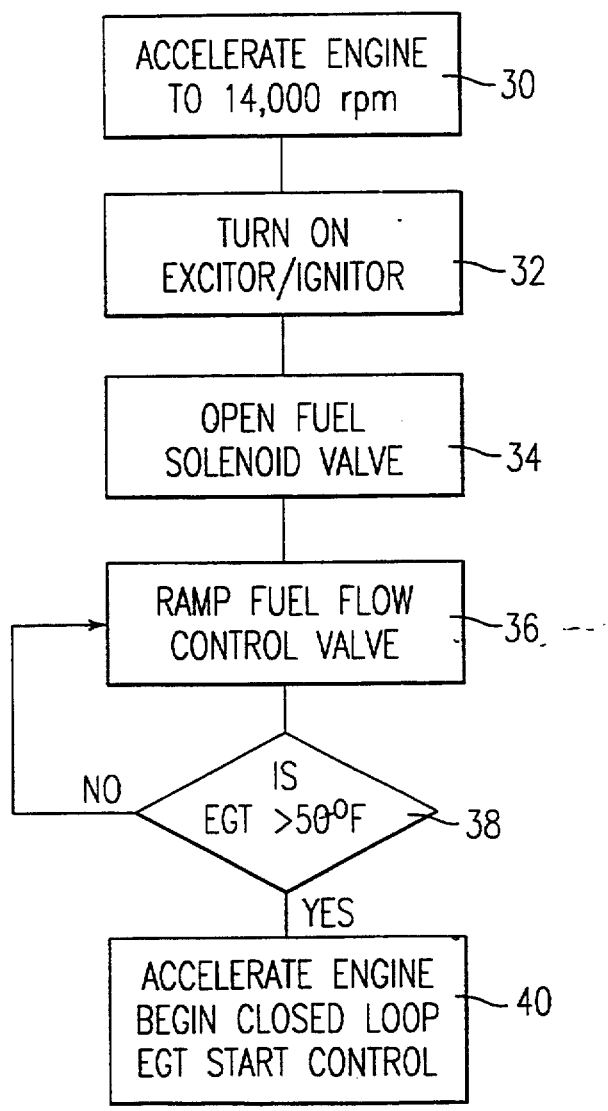

Having thus described the present invention in general terms, reference will now be made to the accompanying drawings in which:

FIG. 1 is a graph of gas turbine engine speed versus time during open loop start-up of the prior art;

FIG. 2 is a graph of fuel flow to the gas turbine engine versus time during open loop start-up of the prior art;

FIG. 3 is a graph of the gas turbine engine fixed speed light-off system and method of the present invention;

FIG. 4 is a schematic block diagram of the fuel control for the gas turbine engine fixed speed light-off system and method of the present invention; and FIG. 5 is a schematic flow diagram of the control logic for the gas turbine engine fixed speed light-off system and method of the present invention.

DETAILED DESCRIPTION OF THE INVENTION

The prior art "open loop" gas turbine engine starting procedure is generally illustrated graphically in FIGS. 1 and 2. As shown in FIG. 1, the gas turbine engine speed, "n" is increased with time "t" during the starting procedure generally along the curved line "R". At the same time, the fuel flow "$W_f$" is increased versus time "t" in the generally straight line "S" in FIG. 2.

The combustion air to the combustor increases generally with gas turbine engine speed, and ignition occurs when the speed produces enough combustion air to produce the correct ratio with the fuel supplied. In order to obtain the correct fuel-to-air ratio, the amount of fuel flow to the gas turbine engine is actively controlled as a function of the speed of the gas turbine.

In an ideal situation, achieving the correct fuel-to-air ration should be relatively simple. With both sides of the fuel-to-air ratio controlled, however, the prior art is like trying to hit a moving target with all the variables that can be present. The fuel flow is highly dependent upon both "$\delta$" and "$\theta$", or in other words atmospheric pressure and temperature with "$\delta$"=$P_{in}$/14.7 and "$\theta$"=$(T_{in}+457.688)/518.688$; $P_{in}$ being gas turbine inlet pressure and $T_{in}$ being gas turbine inlet temperature.

In the prior art, in order for the correct fuel-to-air ratio to be achieved for light-off, atmospheric pressure and temperature must be accurately known; otherwise the representation of fuel flow $W_f$, will not be accurate and throw off the fuel-to-air ratio. Likewise any deviation in the measurement of gas turbine engine speed, or in the correlation of combustion air with gas turbine engine speed, can easily throw off achieving the correct fuel-to-air ratio for ignition. With both speed (combustion air) and fuel flow variable in the open loop prior art starting procedure, ignition is not attempted until the correct fuel-to-air ratio is thought to have been achieved.

The gas turbine engine fixed speed light-off system and method of the present invention is illustrated in FIGS. 3–5. FIG. 3 is a graphical presentation of engine air flow "f" and fuel flow "$W_f$" versus time "t".

To initiate the light-off procedure, the gas turbine engine is run up to a speed selected so as not to be a synchronous speed. If the gas turbine engine is supported by compliant foil hydrodynamic fluid film bearings, the selected speed should be above the bearing lift-off speed and below the first gas turbine engine shaft critical. The selected speed should be a good dwell speed for the gas turbine engine.

In a turbogenerator having a permanent magnet motor/generator coupled to a gas turbine engine, supplying electrical power to the permanent magnet motor/generator will have it function as a motor to drive the gas turbine engine.

At time "A", the gas turbine engine reaches the selected fixed speed, (fourteen thousand (14,000) rpm by way of example) which is then maintained by the permanent magnet motor/generator. Alternately a separate source of power can be utilized to run up and maintain the gas turbine engine speed. In either case, this fixed gas turbine speed is maintained until after light-off. Since air flow "f" is a direct correlation to engine speed "n", this means a substantially constant air flow regardless of atmospheric conditions.

At time "A", fuel flow is initiated as shown by line $W_f$. After an initial level, the fuel flow is increased at a constant rate until it crosses line "f" which represents air flow. Where these two lines "$W_f$" and "f" intersect, at point "X", is where the correct fuel-to-air ratio for light-off is achieved which occurs at time "B".

Regardless of the height of the air flow line "f", or the slope of the fuel flow line $W_f$, the intersection "X" will always occur. The ignition source for the combustor would be turned on at time "A" and light-off will occur at time "B". Once light-off or ignition does occur, the air flow will increase as gas turbine engine speed increases. At time "C" when the exhaust gas temperature rise indicates that light-off has occurred, fuel flow is commanded closed-loop as a function of acceleration or exhaust gas temperature limits.

The combustor 20 of the gas turbine engine 22 is illustrated in the block diagram of FIG. 4. The back emf 24, indicative of the gas turbine engine speed, is measured and a signal is supplied to the gas turbine engine controller 26. The controller 26 provides a signal to the FCU (fuel control unit) 28 which controls the flow of fuel to the combustor 24 of the gas turbine engine 22.

The control logic of the gas turbine engine fixed speed light-off system and method of the present invention is illustrated in FIG. 5 in flow chart format and generally corresponds to FIG. 3. The sequential steps in the light-off procedure are included in individual blocks.

Block 30 represents the first step of accelerating the gas turbine engine to fourteen thousand (14,000) rpm. The excitor/ignitor is turned on as represented in block 32. Blocks 34 and 36 represent the opening of the fuel solenoid valve and the ramping up of fuel flow with a control valve, respectively.

If the gas turbine engine exhaust gas temperature (EGT) has a delta of more than fifty (50) degrees Fahrenheit, which would indicate that light-off has occurred (represented by comparator block 38) the gas turbine engine is accelerated to begin closed loop exhaust gas temperature start control (block 40). If the comparator block 38 does not sense the required fifty degree EGT delta, then the ramping of the fuel flow control valve continues.

The gas turbine engine light-off system and method of the present invention is insensitive to fuel control variations, gas turbine engine variations, and ambient conditions. Fuel is not scheduled as a function of gas turbine engine speed and light-off will occur under any conditions.

While specific embodiments of the invention have been illustrated and described, it is to be understood that these are provided by way of example only and that the invention is not to be construed as being limited thereto but only by the proper scope of the following claims.

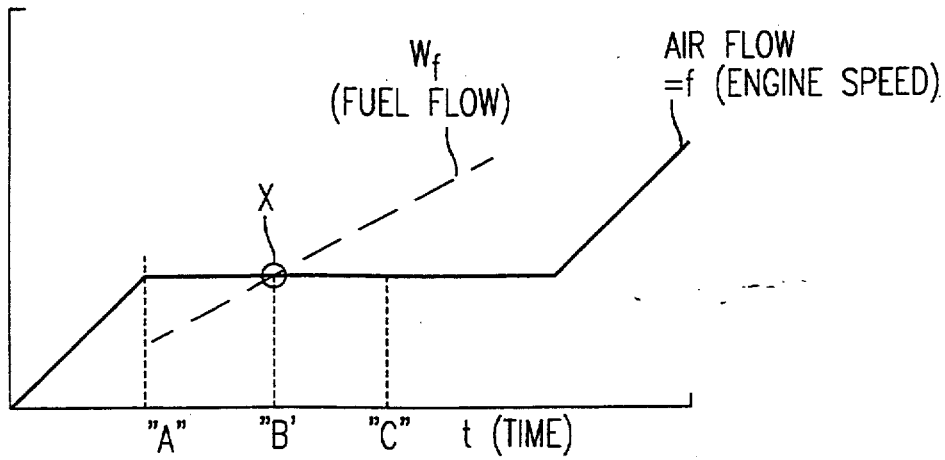

What I claim is:

1. A method of starting a gas turbine engine comprising the steps of:
    a) accelerating the gas turbine engine to a speed to provide optimum combustion air for light-off of the gas turbine engine and maintaining the gas turbine engine at this speed;
    b) activating the ignition source for the gas turbine engine combustor; and
    c) ramping up the flow of fuel to the gas turbine engine combustor at a substantially constant rate until the correct fuel-to-air ratio is achieved and light-off of the gas turbine engine occurs.

2. A method of starting a gas turbine engine comprising the steps of:
    a) accelerating the gas turbine engine to a speed to provide optimum combustion air for light-off of the gas turbine engine;
    b) activating the gas turbine engine combustor ignition source and initiating the flow of fuel to the gas turbine engine combustor when the gas turbine engine reaches the speed of step a); and
    c) maintaining the speed of the gas turbine engine at the speed of step a) and ramping up the flow of fuel to the gas turbine engine combustor at a substantially constant rate until the fuel-to-air ratio is correct for ignition and light-off of the gas turbine engine occurs.

3. The gas turbine engine starting method of claim 1 wherein the gas turbine engine is accelerated in step a) to a speed of around fourteen thousand rpm and maintained at that speed in step c).

4. A method of starting a gas turbine engine comprising the steps of:
    a) accelerating the gas turbine engine to a speed to provide optimum combustion air for light-off of the gas turbine engine;
    b) activating the gas turbine engine combustor ignition source and initiating the flow of fuel to the gas turbine engine combustor when the gas turbine engine reaches the speed of step a);
    c) maintaining the speed of the gas turbine engine at the speed of step a) and ramping up the flow of fuel to the gas turbine engine combustor at a substantially constant rate until the fuel-to-air ratio is correct for ignition and light-off of the gas turbine engine occurs; and
    d) measuring the gas turbine engine exhaust gas temperature to detect light-off.

5. The method of starting a gas turbine engine of claim 4 including the additional step of:
    e) after light-off commanding fuel flow closed loop as a function of gas turbine engine acceleration or exhaust gas temperature limits.

* * * * *

UNITED STATES PATENT AND TRADEMARK OFFICE
CERTIFICATE OF CORRECTION

PATENT : 6,062,016

DATED : May 16, 2000

INVENTOR(S) : Edelman

It is certified that error appears in the above-identified patent and that said Letters Patent is hereby corrected as shown below:

The title page, showing the illustrative figure should be deleted to be Replaced with the attached title page.

Signed and Sealed this

Twenty-seventh Day of February, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

PATENT NO. : 6,062,016

DATED : May 16, 2000

INVENTOR(S): Edelman

It is certified that an error appears in the above-identified patent and that said Letters Patent is hereby corrected as shown in the attached corrected Figures 1 - 5:

```
Drawing Sheet 1 of 3, Figure 1, change "N" to --n--
                                change "(Time)" to --t(Time)--
                                change "Prior Art" to --(Prior Art)--
                      Figure 2, change "Wf" to --W_f--
                                change "(Time)" to --t(Time)--
                                change "8" to --δ--
                                change "0" to --θ--
                      Figure 3, change "Wf" to --W_f--
                                change "(Time)" to --t(Time)--
                                correction to lines as shown on
                                   attached drawings Drawing Sheet 2 of 3, Figure 4, change "26" to --26--
                                change "20" to --20--
                                insert --n-- as shown on attached
                                   drawings
                                insert arrow as shown on attached
                                   drawings Drawing Sheet 3 of 3, Figure 5, change ">50 F" to -->50°F--
                                insert correction to arrow as shown
                                   on attached drawings.
```

United States Patent
Edelman

[11] Patent Number: 6,062,016
[45] Date of Patent: May 16, 2000

[54] GAS TURBINE ENGINE FIXED SPEED LIGHT-OFF METHOD

[75] Inventor: Edward C. Edelman, Agoura Hills, Calif.

[73] Assignee: Capstone Turbine Corporation, Tarzana, Calif.

[21] Appl. No.: 08/837,600

[22] Filed: Apr. 21, 1997

[51] Int. Cl.[7] ............................................ F02C 7/26
[52] U.S. Cl. ............................ 60/39.06; 60/39.141
[58] Field of Search ..................... 60/39.06, 39.141, 60/39.142, 39.281

[56] References Cited

U.S. PATENT DOCUMENTS

| | | |
|---|---|---|
| 3,520,133 | 7/1970 | Loft et al. ............ 60/39.281 |
| 3,793,826 | 2/1974 | Holleboom et al. . |
| 3,834,160 | 9/1974 | Moehring et al. . |
| 3,844,112 | 10/1974 | Harrison . |
| 3,943,372 | 3/1976 | Smith et al. ............ 60/39.281 |
| 3,958,413 | 5/1976 | Cornelius et al. . |
| 4,039,804 | 8/1977 | Reed et al. . |
| 4,134,259 | 1/1979 | Gardner et al. . |
| 4,321,791 | 3/1982 | Carroll ............ 60/39.141 |
| 4,350,008 | 9/1982 | Zickwolf, Jr. . |
| 4,817,389 | 4/1989 | Holladay et al. . |
| 5,101,619 | 4/1992 | Morris et al. ............ 60/39.141 |
| 5,107,674 | 4/1992 | Wibbelsman et al. . |
| 5,123,239 | 6/1992 | Rodgers . |
| 5,127,220 | 7/1992 | Jesrai et al. . |
| 5,129,221 | 7/1992 | Walker et al. ............ 60/39.141 |
| 5,212,943 | 5/1993 | Harris . |

*Primary Examiner*—Louis J. Casaregola
*Attorney, Agent, or Firm*—Albert J. Miller

[57] ABSTRACT

A gas turbine engine light-off system and method in which the gas turbine engine is operated at a fixed speed to provide a substantially constant supply of combustion air for light-off and the fuel flow is ramped up to achieve the correct fuel-to-air ratio for light-off.

5 Claims, 3 Drawing Sheets